United States Patent [19]
Mizutani

[11] Patent Number: 5,707,185
[45] Date of Patent: Jan. 13, 1998

[54] INDEXABLE INSERT FOR MILLING AND MILLING CUTTER EMPLOYING THE SAME

[75] Inventor: Masanori Mizutani, Hyogo, Japan

[73] Assignee: Sumitomo Electric Industries, Ltd., Osaka, Japan

[21] Appl. No.: 527,107

[22] Filed: Sep. 12, 1995

[30] Foreign Application Priority Data

Sep. 22, 1994 [JP] Japan ................................ 6-227957
Jun. 29, 1995 [JP] Japan ................................ 7-163769

[51] Int. Cl.⁶ ................................................ B23C 5/20
[52] U.S. Cl. ........................ 407/42; 407/53; 407/119
[58] Field of Search ............................. 407/42, 53, 32, 407/61, 62, 113, 118, 119; 408/145

[56] References Cited

U.S. PATENT DOCUMENTS

| | | |
|---|---|---|
| 4,616,962 | 10/1986 | Ushijima et al. ............... 407/113 |
| 4,681,488 | 7/1987 | Markusson ................... 407/113 X |
| 4,687,383 | 8/1987 | Shimomura et al. .......... 407/119 X |
| 4,714,385 | 12/1987 | Komanduri . |
| 4,966,500 | 10/1990 | Tsujimura et al. ............ 407/113 X |
| 5,120,327 | 6/1992 | Dennis ........................ 407/119 X |
| 5,141,367 | 8/1992 | Beeghly et al. .............. 407/114 X |
| 5,188,489 | 2/1993 | Santhanam et al. ............. 407/119 |

FOREIGN PATENT DOCUMENTS

| | | | |
|---|---|---|---|
| 4013717 | 4/1991 | Germany ................... 407/61 |
| 4341503 | 6/1995 | Germany . | |
| 61-100302 | 5/1986 | Japan . | |
| 0159314 | 7/1986 | Japan ....................... 407/61 |
| 404310303 | 11/1992 | Japan ...................... 408/145 |

OTHER PUBLICATIONS

"Tool and Manufacturing Engineers Handbook", 4th edition, vol. 1 Machining, Society of Manufacturing Engineers(SME), Chapter 8.

Machines Production, Fraises: Repondre Aux Besoins Actuels de l'Automobile, May 1982, pp. 13–15, 17.

Primary Examiner—Daniel W. Howell
Assistant Examiner—Henry W. H. Tsai
Attorney, Agent, or Firm—W. G. Fasse; W. F. Fasse

[57] ABSTRACT

An indexable insert for milling includes a metal base made of cemented carbide, and a cutting edge consisting of a sintered CBN compact and a flat drag type cutting edge which are brazed to the metal base or bonded thereto by integral sintering. A subcutting edge angle ($\beta$), a negative land angle ($\theta$) and a negative land width (L) are set at 30° to 60°, 30° to 45° and 0.05 to 0.40 mm respectively, while the subcutting edge has a straight shape. Due to this structure, the indexable insert has excellent cutting performance particularly in face milling of parts which are made of gray cast iron, and the tool life can be extended.

20 Claims, 17 Drawing Sheets

FIG. 8

| EXPERIMENT NO. | ENLARGED PLAN VIEW AROUND SUBCUTTING EDGE | NEGATIVE LAND ANGLE($\theta$) | DAMAGED STATE OF CUTTING EDGE | THERMAL CRACKING | FLANK WEAR |
|---|---|---|---|---|---|
| 1 | $\beta = 20°$ | 25° | | MUCH | BAD |
| 2 | | 45° | | MANY | BAD |
| 3 | $\beta = 30°$ | 25° | | MANY | BAD |
| 4 | | 30° | | A LITTLE | BAD |
| 5 | | 45° | | A LITTLE | GOOD |
| 6 | $\beta = 45°$ | 25° | | MANY | BAD |
| 7 | | 30° | | A LITTLE | GOOD |
| 8 | | 45° | | LESS | BEST |
| 9 | $\beta = 60°$ | 30° | | LESS | WORSE |
| 10 | | 45° | | NONE | WORSE |
| 11 | $\beta = 75°$ | 30° | | NONE | WORST |
| 12 | | 45° | | NONE | WORST | ns
INDEXABLE INSERT FOR MILLING AND MILLING CUTTER EMPLOYING THE SAME

BACKGROUND OF THE INVENTION

1. Field of the Invention

The present invention relates to an indexable insert which is clamped into a face milling cutter for face milling of cast-iron parts and relates to a milling cutter employing such an indexable insert, and more particularly, it relates to an indexable insert for milling which enables ultrahigh speed milling of cast-iron parts while attaining a long tool life and a milling cutter employing the same.

The indexable insert for milling according to the present invention attains a remarkable effect particularly when it is applied for milling gray cast iron.

2. Description of the Background Art

Cast-iron parts such as cylinder blocks and cylinder heads for automobile engines are generally face-milled by cemented carbide inserts, coated inserts, ceramic inserts, etc. In general, negative land angles of 15° and 25° are well known in relation to conventional indexable inserts for milling which are made of cemented carbide and formed by a sintered cubic boron nitride compact (hereinafter referred to as "CBN compact") respectively.

In face milling of cast-iron parts, cemented carbide and coated inserts are utilized at cutting speeds V of about 150 to 250 m/min., while a ceramic insert is utilized at a cutting speed V of about 400 m/min. in practice. If the cutting speeds are increased beyond these ranges, the tool life of the inserts is disadvantageously reduced, whereby the working costs are increased.

In recent years, however, machine tools which are capable of high-speed rotation have been developed one after another, and the development of tools having cutting edges which can cope with such machine tools has been long awaited.

Increase of the cutting speed leads to improvement of productivity, as a matter of course. It has been known in the art that the cutting speed of a cutting tool prepared from a sintered CBN compact can be increased to at least three times that of a ceramic insert.

However, the sintered CBN compact is easy to chip since it is inferior in toughness as compared to other cutting tool materials due to its characteristics, and thermal cracking is easily caused due to heat effects. When the sintered CBN compact is simply applied to a cutting edge, therefore, it may not be possible to attain a sufficient life.

SUMMARY OF THE INVENTION

An object of the present invention is to provide an indexable insert for milling which can excellently finish a machined surface of a workpiece while attaining a sufficient tool life particularly in high-speed cutting of at least 800 m/min., or at least 1000 m/min. and a milling cutter employing the same.

The indexable insert for milling according to the present invention comprises a base metal which is made of cemented carbide containing WC and Co, and a cutting edge consisting of a sintered cubic boron nitride compact, comprising a CBN layer and a substrate, which is brazed to the base metal.

The indexable insert for milling according to the present invention can be made with a substrate and a cutting edge consisting of a sintered cubic boron nitride compact which is integrally sintered with the substrate. The cutting edge includes a subcutting edge which has a subcutting edge angle $\beta$ of at least 30° and not more than 60° and a flat drag type main cutting edge which is continuous thereto, and has a negative land angle $\theta$ of at least 30° and not more than 45° and a negative land width L of at least 0.05 mm and not more than 0.40 mm, while the subcutting edge has a straight shape.

According to this structure of the indexable insert for milling, the cutting edge is hardly affected by heat due to the subcutting edge angle $\beta$ of at least 30°, whereby the occurrence of thermal cracking is prevented. Further, an increase of cutting resistance is prevented since the subcutting edge angle $\beta$ is not more than 60°, whereby the indexable insert is maintained in excellent sharpness.

Due to the negative land angle $\theta$ of at least 30° and not more than 45°, further, high-speed milling of at least 800 to 1000 m/min. is enabled. While a conventional sintered CBN compact tool has a standard negative land angle $\theta$ of 25°, the aforementioned high-speed milling is enabled by increasing the negative land angle $\theta$ beyond this standard. While it has generally been regarded as impractical to increase the negative land angle $\theta$ since cutting resistance is excessively increased in this case, the present invention enables cutting with a large negative land angle $\theta$ in milling at a high speed exceeding 800 m/min., since the strength of a workpiece is rapidly reduced, particularly when the workpiece is made of gray cast iron.

In addition, the negative land width L is set to be at least 0.05 mm, whereby the subcutting edge and the flat drag type cutting edge are inhibited from chipping. The negative land width L is set to be not more than 0.40 mm, in order to form a cutting edge ridgeline 8 within the range of a thickness t of a CBN layer as shown in FIG. 19, since the thickness (t shown in FIGS. 19 and 20) of a general CBN layer is about 0.8 mm. If the negative land angle $\theta$ and the negative land width L are set at 45° and 1.2 mm respectively, for example, the negative land is so excessively increased in size that the actual cutting edge ridgeline 8 is not formed on the sintered CBN compact, i.e. in the range of the thickness t of the CBN layer, as shown in FIG. 20. Further, the sintered CBN compact is so hard that it is difficult to grind the same as compared with cemented carbide etc. If the negative land width L is meaninglessly increased, therefore, the time for grinding the negative land is so extremely increased that the cost for working the indexable insert is disadvantageously increased as the result.

The aforementioned object of the present invention is attained through the straight shape of the subcutting edge, and the desired effect cannot be attained if the subcutting edge has a curved shape. When the subcutting edge has a straight shape, the contact length between the same and a workpiece can be further reduced as compared with a curved subcutting edge in relation to the same depth of cut.

The negative land width L of the cutting edge is preferably at least 0.075 mm and not more than 0.30 mm. The effect of inhibiting the cutting edge from chipping is further facilitated due to the lower limit of at least 0.075 mm, while the thickness of the CBN layer is such that it facilitates the effect of preventing an increase of the time for grinding the negative land due to the upper limit of not more than 0.30 mm.

The flat drag type cutting edge is preferably in the form of a circular arc having a radius of curvature of at least 200 mm and not more than 400 mm, in order to improve machined surface roughness due to such an arcuate shape of the flat drag type cutting edge.

FIG. 21 shows an exemplary flat drag type cutting edge 4. The radius R of curvature of the arcuate tooth profile is set in the range of at least 200 mm and not more than 400 mm for the following reason. If the radius R of curvature of the arcuate tool profile exceeds 400 mm, the contact length between the flat drag type cutting edge 4 and a workpiece is further increased as compared with a cutting edge having a small radius of curvature which thereby increases cutting resistance, leading to occurrence of a chatter phenomenon during cutting. If the radius R of curvature is smaller than 200 mm, on the other hand, machined surface roughness of the workpiece is hardly improved as compared with an indexable insert in the form of a straight flat drag.

The aforementioned indexable insert for milling according to the present invention can also be employed along with a cemented carbide insert and a ceramic insert. In other words, indexable inserts of different materials can be applied to a milling cutter together. In milling with such different types of inserts, the indexable insert according to the present invention is employed as a wiper insert, to attain an effect of improving machined surface roughness of the workpiece.

However, the cemented carbide and ceramic inserts are not durable for high-speed milling. In order to carry out high-speed cutting, therefore, all of the plurality of indexable inserts which are clamped on the cutter are preferably prepared from the inventive indexable inserts.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows enlarged plan views around subcutting edges, negative land angles, and post-experiment damaged states of cutting edges in indexable inserts that were employed for respective experiments in Example 1 of the present invention;

DETAILED DESCRIPTION OF THE PREFERRED EMBODIMENTS AND OF THE BEST MODE OF THE INVENTION

Figure 2:
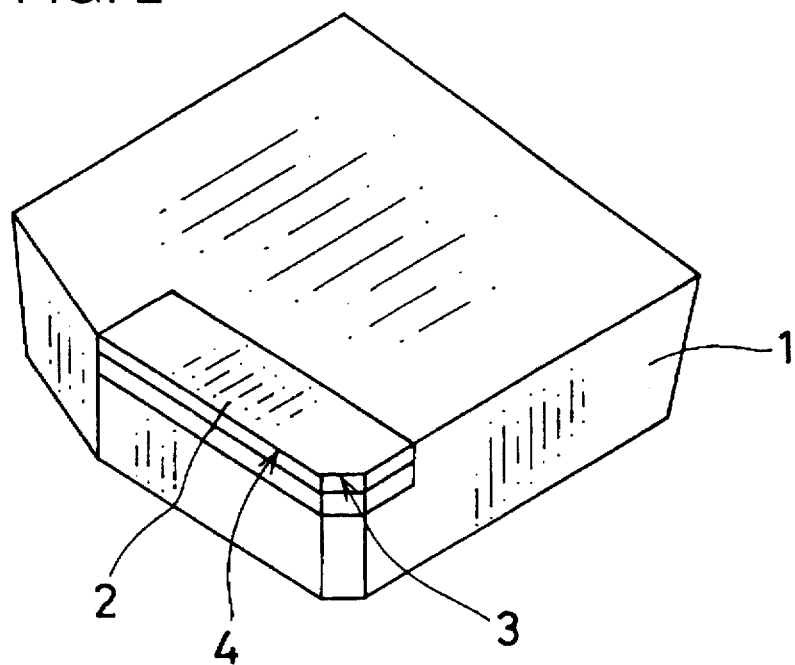
FIG. 2 is a perspective view showing a typical mode of an indexable insert for milling to which the present invention is applied.
Figure 3A:
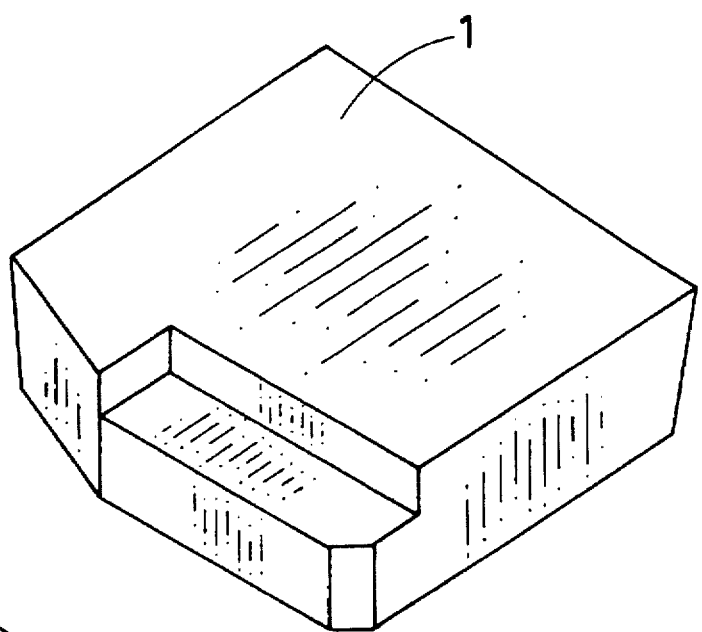
FIGS. 3A and 3B are perspective views illustrating a substrate and a cutting edge of the indexable insert for milling shown in FIG. 2, in a state not brazed to each other.
Figure 3B:
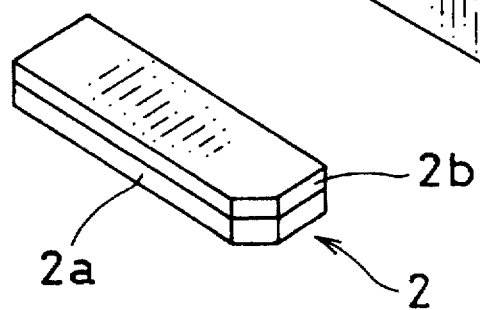

Embodiments of the present invention are now described with reference to the drawings. FIG. 2 shows a typical mode of an indexable insert for milling according to the present invention. The indexable insert shown in FIG. 2 consists of a metal base 1 made of cemented carbide containing WC and Co, and a sintered CBN compact 2, forming a cutting edge, which is brazed to the metal base 1 at a portion close to an upper surface corner of the metal base 1. The CBN sintered compact 2 has a subcutting edge 3 on an upper edge of its corner portion, and a flat drag type cutting edge 4 provided in continuation to this subcutting edge 3. FIGS. 3A and 3B illustrate the metal base 1 and the sintered CBN compact 2 of the indexable insert shown in FIG. 2, which are not yet brazed to each other. As shown in FIG. 3B, the sintered CBN compact 2 is formed by a substrate 2a of cemented carbide and a CBN layer 2b which are integrally sintered with each other in a stacked state.

Figure 4:
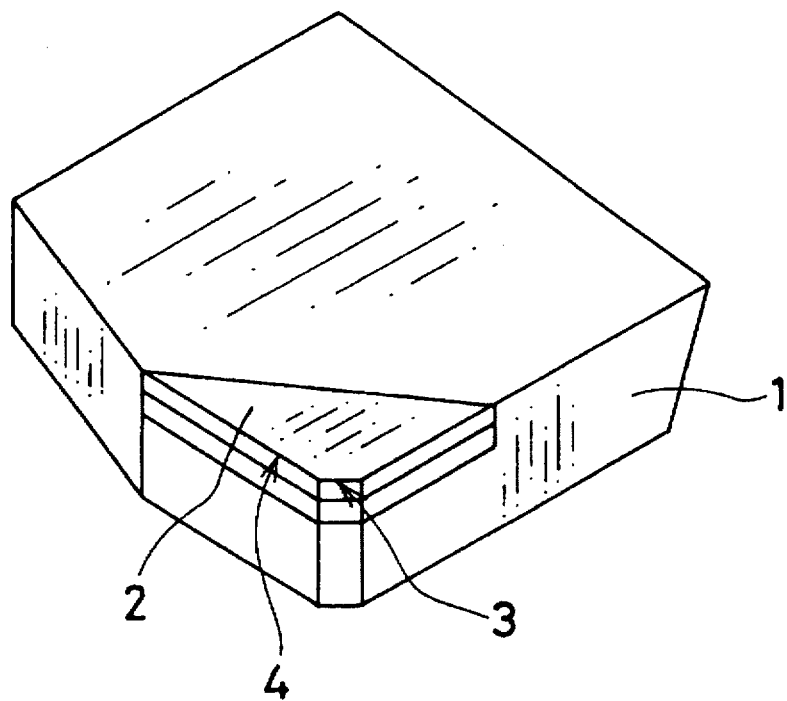
FIG. 4 is a perspective view illustrating a modification of the shape of a cutting edge of the indexable insert for milling shown in FIG. 2.
Figure 5:
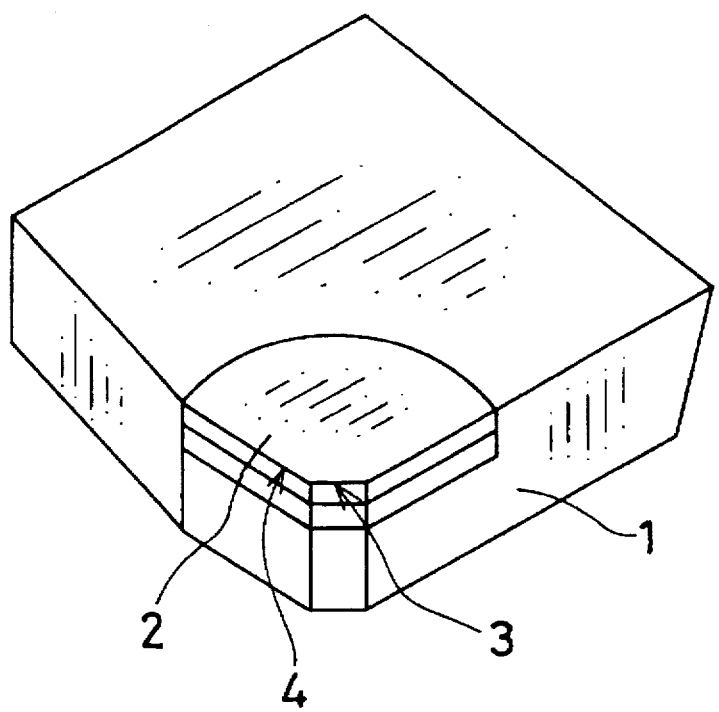
FIG. 5 is a perspective view illustrating another modification of the shape of the cutting edge of the indexable insert for milling shown in FIG. 2.
Figure 6:
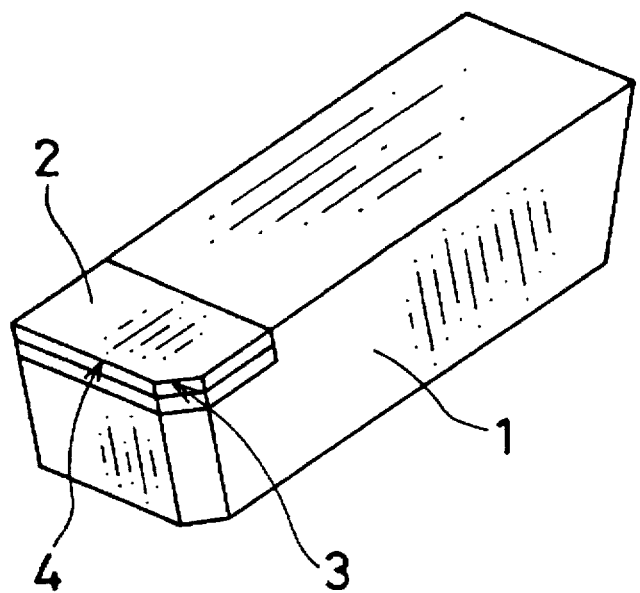
FIG. 6 is a perspective view showing an indexable insert for milling according to the present invention, in an exemplary mode, wherein a cutting edge is brazed to an upper surface around an end of an elongated metal base.

FIGS. 4 and 5 show other modes of indexable inserts in which cutting edges consisting of sintered CBN compacts are brazed to metal bases only at portions close to upper surface corners of the metal bases. FIG. 6 shows a further indexable insert in which a sintered CBN compact 2 is brazed to only an upper surface portion around an end of a metal base 1, made of cemented carbide, which is in the form of an elongated block.

Figure 7:
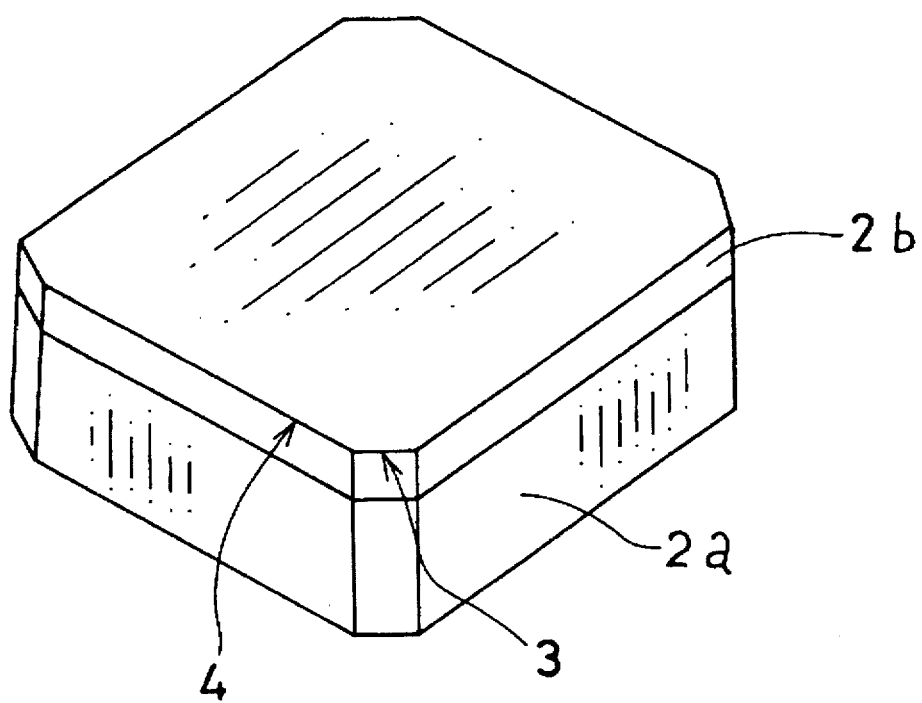
FIG. 7 is a perspective view showing an indexable insert for milling according to the present invention, having a substrate and a cutting edge made of a sintered CBN compact integrally sintered with each other.

While the sintered CBN compacts 2 are bonded to the metal bases 1 by brazing in all of the indexable inserts shown in FIGS. 2 to 6, the present invention is also applicable to an indexable insert formed by a support layer 2a of cemented carbide and a CBN layer 2b consisting of a sintered CBN compact which are integrally sintered with each other, as shown in FIG. 7.

Figure 15A:
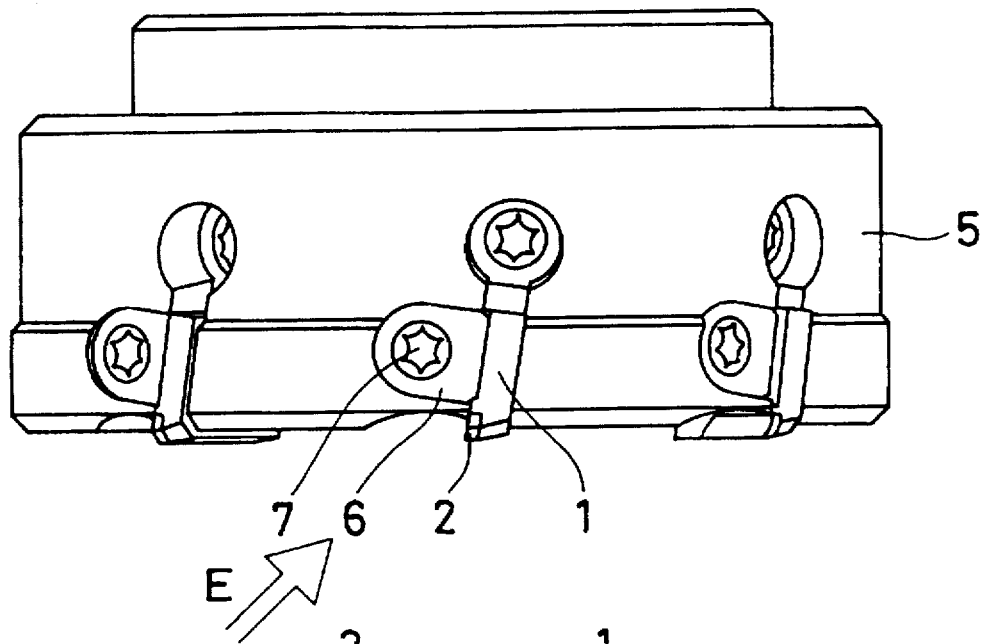
FIGS. 15A and 15B are a plan view and a front elevational view of a face milling cutter on which the inventive indexable inserts for milling are clamped.
Figure 15B:
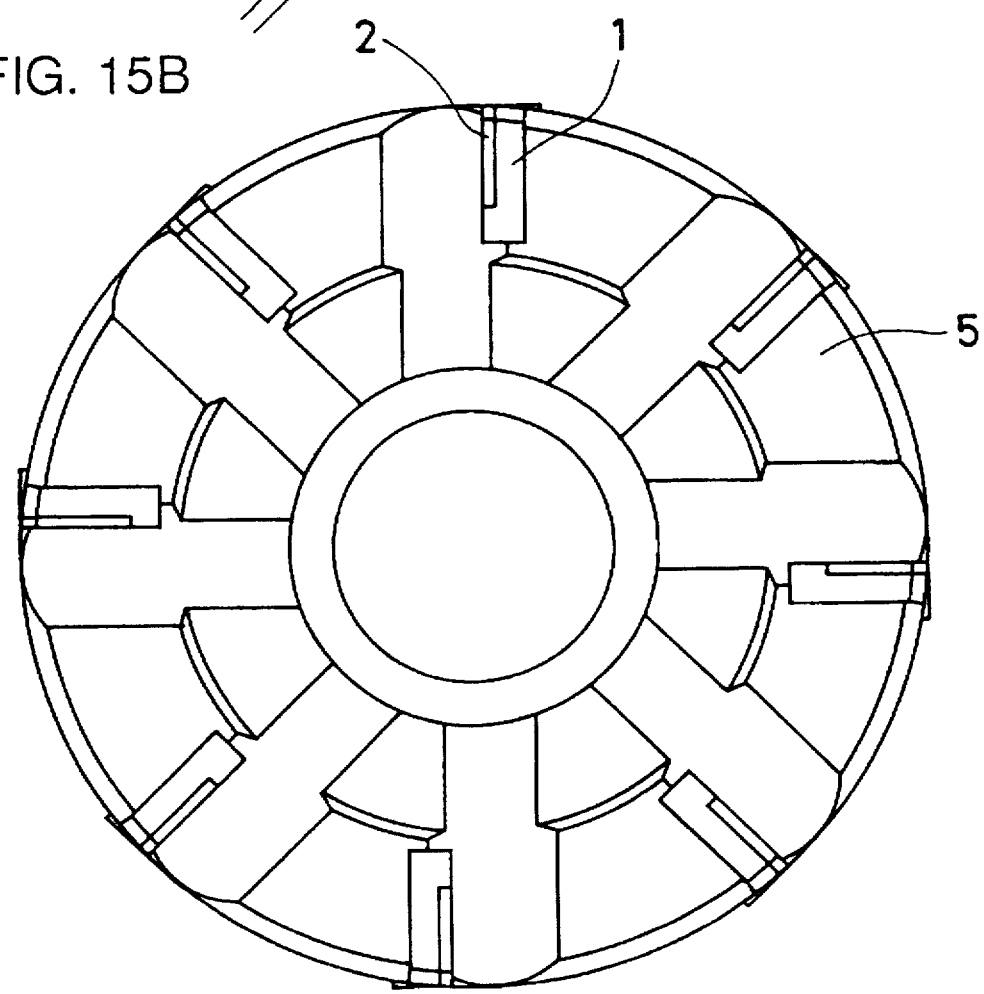
Figure 23A:
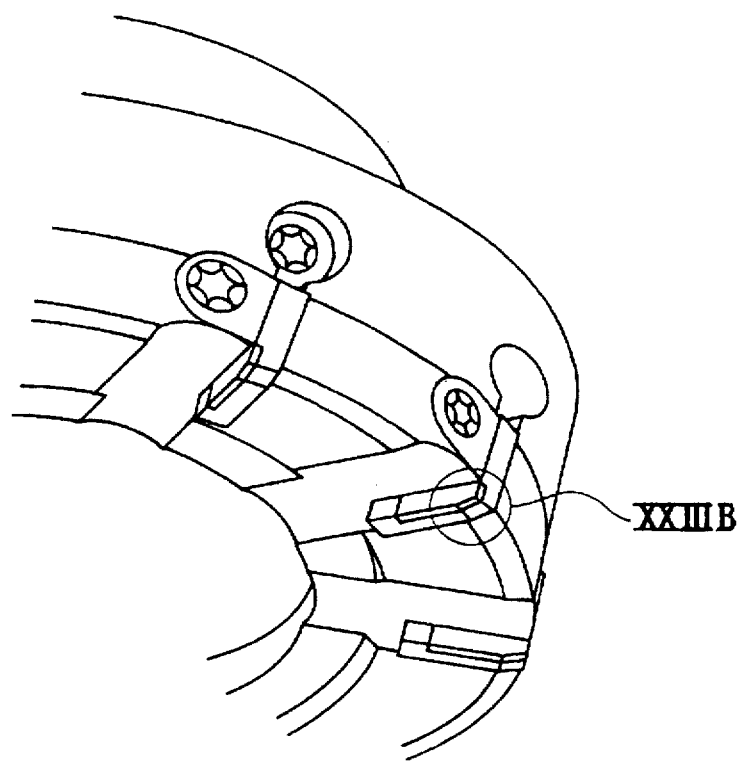
FIG. 23A is a partially fragmented perspective view of the face milling cutter shown in FIG. 15A as viewed along arrow E.
Figure 23B:
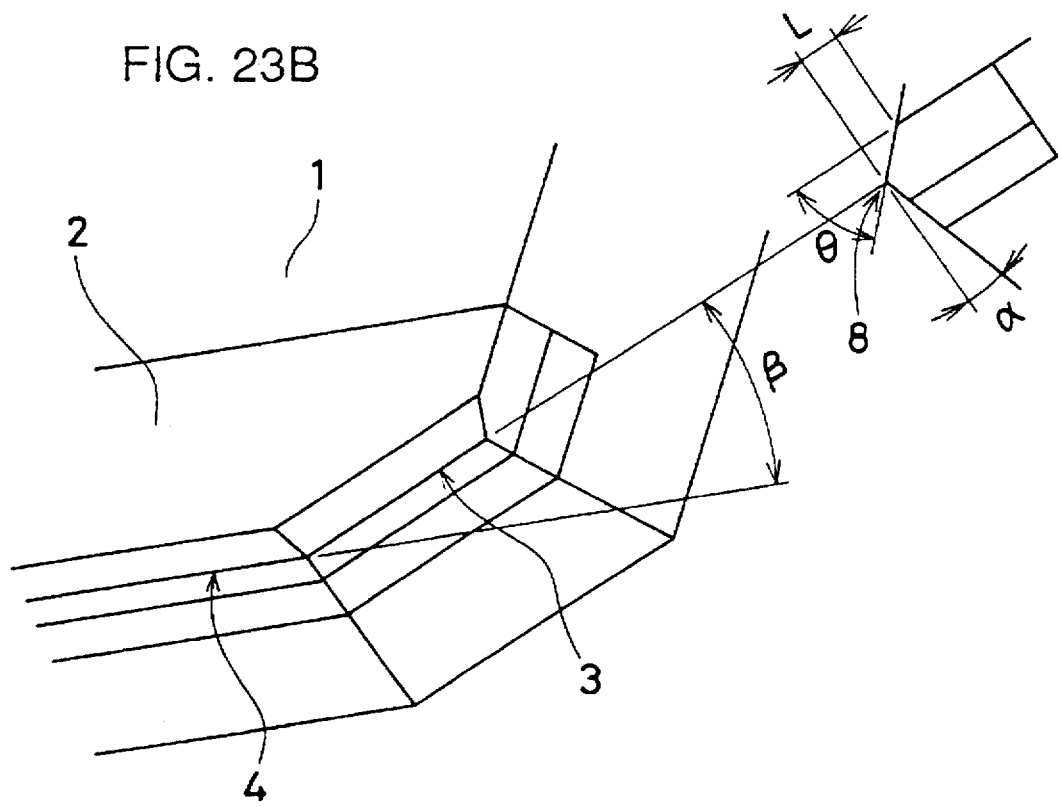
FIG. 23B illustrates a detail portion XXIIIB in FIG. 23A in an enlarged manner.

Each of the aforementioned indexable inserts is clamped as a cutting edge into a face milling cutter shown in FIGS. 15A and 15B. Referring to FIGS. 15A and 15B, indexable inserts having the shape shown in FIG. 2 are clamped into the body 5 of the face milling cutter, so that the metal base 1 of each indexable insert is fixed to the cutter body 5 by a clamp wedge 6 and a clamp screw 7. FIG. 23A is a perspective view of the face milling cutter as viewed along arrow E in FIG. 15A, three-dimensionally showing the indexable inserts which are clamped into the cutter body. FIG. 23B is an enlarged detail view of an edge part XXIIIB of the indexable insert shown in FIG. 23A, showing a subcutting edge angle β, a negative land angle θ, a negative land width L and a clearance angle α of the indexable insert respectively.

Concrete examples including experiments for verifying the function and effect of the indexable insert for milling according to the present invention are now described with reference to the drawings.

Figure 1A:
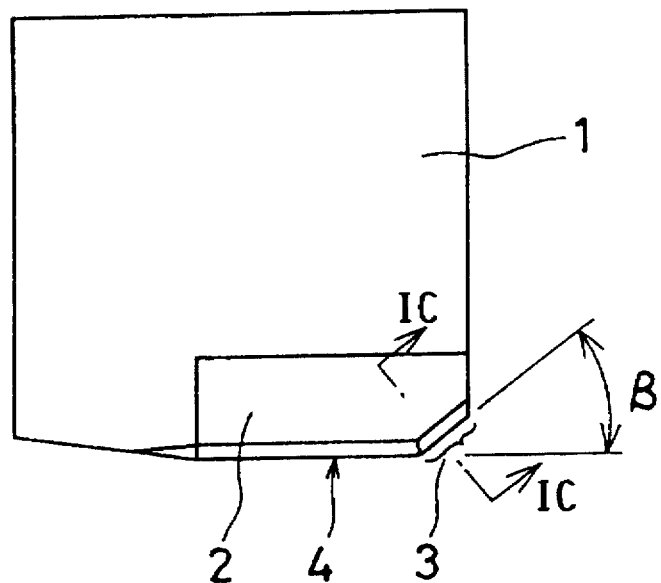
FIGS. 1A and 1B are a plan view and a right side elevational view showing an indexable insert employed in Examples of the present invention.
Figure 1B:
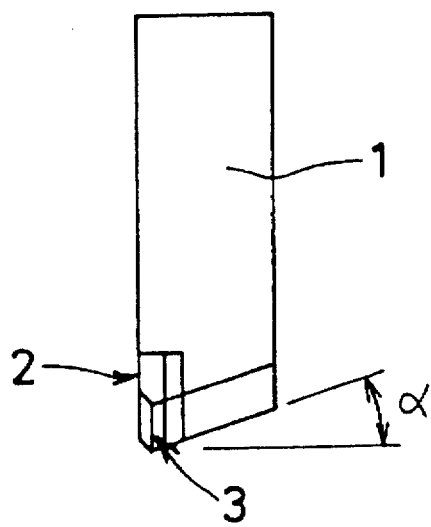
Figure 1C:
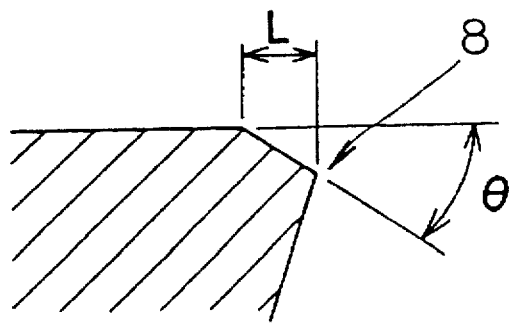
FIG. 1C is a sectional view taken along the line Ic—Ic in FIG. 1A.

In general, the cutting edge of a face milling cutter is formed by a subcutting edge 3 and a flat drag 4 as shown in FIGS. 1A to 1C, and a negative land is provided as the case may be. It has been proved by the results of the following experiments that the proper setting of a subcutting edge angle β, a negative land angle θ and a negative land width L is extremely important when a sintered CBN compact is employed as the cutting edge.

In the following Examples, indexable inserts of the mode shown in FIG. 2 were employed with planar and right side elevational shapes shown in FIGS. 1A and 1B respectively. The subcutting edge angle β is defined in FIG. 1A, while the negative land angle θ and the negative land width L are defined in FIG. 1C.

A clearance angle which is defined by an angle α shown in FIG. 1B may be either 0° or an acute angle which is in the range of 5° to 20°. In each of the following Examples, the clearance angle α was set at 15°.

Figure 17A:
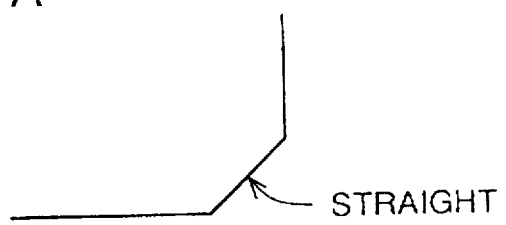
FIGS. 17A, 17B and 17C are enlarged plan views showing portions and around subcutting edges having a straight shape, an arcuate shape, and a combined shape of straight and arcuate ones respectively.
Figure 17B:
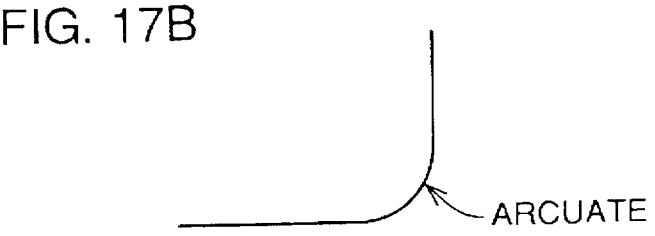
Figure 17C:
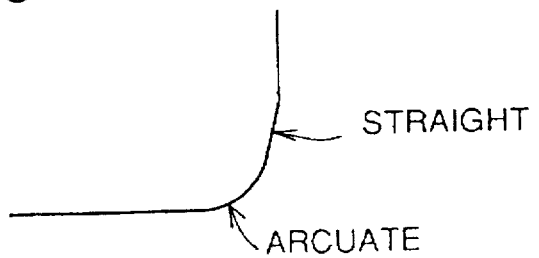

In each of the indexable inserts employed in the following Examples, the subcutting edge 3 had a straight shape. The reason for this is explained as follows, on the basis of FIGS. 17A to 17C and 18A to 18C. As to the shapes of portions of cutting edges around the subcutting edges, it is possible to use a straight shape, an arcuate shape and a combination of straight and arcuate shapes as shown in FIGS. 17A to 17C respectively. The arcuate subcutting edge shown in FIG. 17B has been mainly employed, and a straight cutting edge has not been used in general. Comparing FIGS. 18A, 18B and 18C with each other, however, it is understood that the contact length 1 between an arcuate subcutting edge shown in FIG. 18C and a workpiece is longer than that which can be achieved between a straight subcutting edge shown in FIG. 18A and FIG. 18B and a workpiece, in relation to the same depth d of cut. In the case of a subcutting edge having a curved shape such as an arcuate shape, therefore, the heating effect in cutting is so increased as to disadvantageously cause thermal cracking. On the other hand, it is possible to minimize the contact length between the subcutting edge and the workpiece by forming the subcutting edge as a straight edge at the proper angle in accordance with the inventive indexable insert, thereby reducing the heating effect and suppressing the occurrence of thermal cracking.

While the flat drag type cutting edge 4 of the sintered CBN compact 2 may have a straight shape, arcuate flat drag type cutting edges having radii of curvature of 200 to 400 mm were employed in the following Examples, in order to improve machined surface roughness.

EXAMPLE 1

Figure 22:
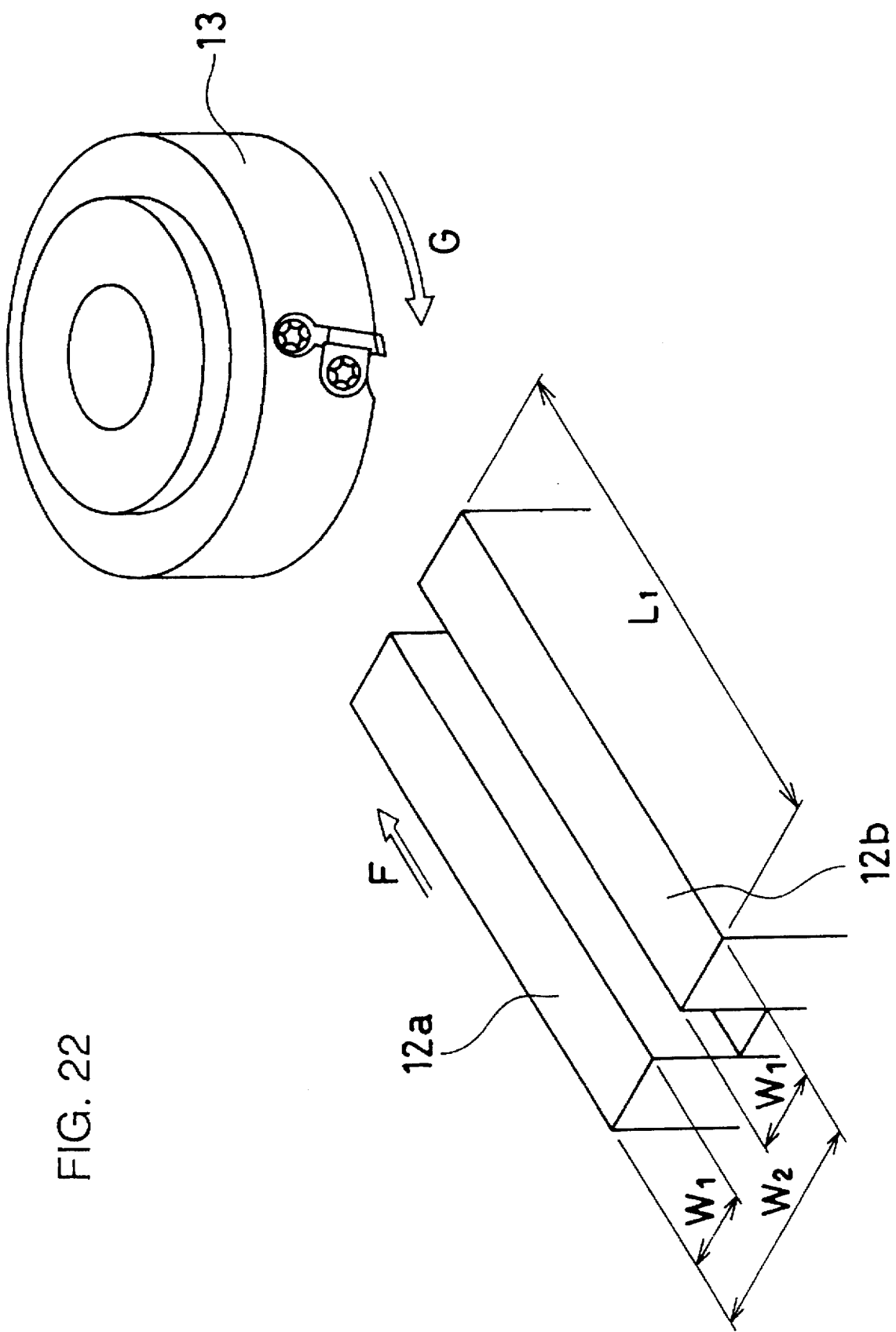
FIG. 22 is a perspective view typically showing the state of each cutting experiment carried out in relation to the present invention.

In Example 1, the negative land width L was fixed at 0.2 mm, while the subcutting edge angle β and the negative land angle θ were varied to carry out experiments. In these experiments, two plates 12a and 12b that were 25 mm in width and 150 mm in length and were made of gray cast iron (FC 250 in Japanese Industrial Standard) were employed and set as shown in FIG. 22. An indexable insert of experiment No. 1 shown in FIG. 8 was first clamped on a face milling cutter 13 of 200 mm diameter shown in FIG. 22, and was used to carry out cutting for 100 passes under conditions of a cutting speed of 1000 m/min., a feed rate of 0.15 mm/tooth, and a depth of cut of 0.5 mm, and thereafter a damaged state of the cutting edge was checked. Then similar experiments were successively carried out on indexable inserts of experiments Nos. 2 to 12 shown in FIG. 8. Each experiment was stopped at 100 passes since it was possible to correctly compare damaged states of the various shapes of edges employed in the experiments after cutting for 100 passes. Not every cutting edge reached the end of its life after cutting for 100 passes.

In each intermittent cutting experiment shown in FIG. 22, the face milling cutter 13 was rotated along arrow G, while the plates 12a and 12b were fed along arrow F. Dimensions L1, W1 and W2 shown in FIG. 22 are 150 mm, 25 mm and 65mm respectively.

Figure 9A:
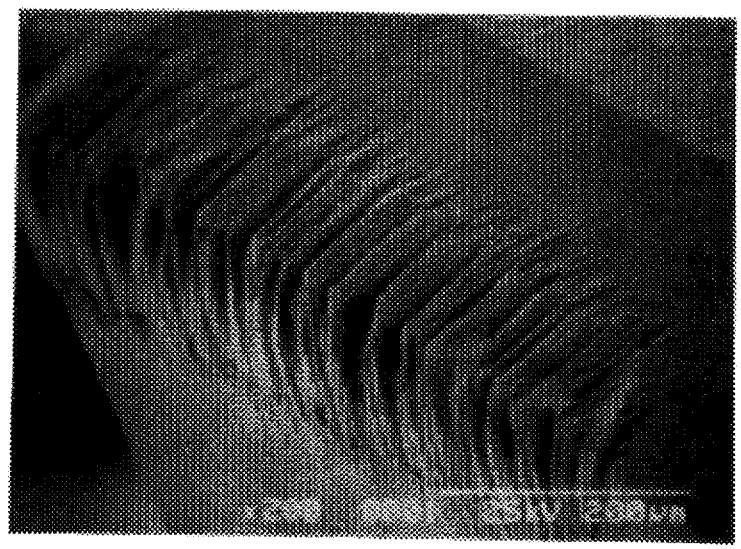
FIGS. 9A and 9B are microphotographs showing a typical thermal crack caused in an edge and a typical example of a worn state of an edge respectively.
Figure 9B:
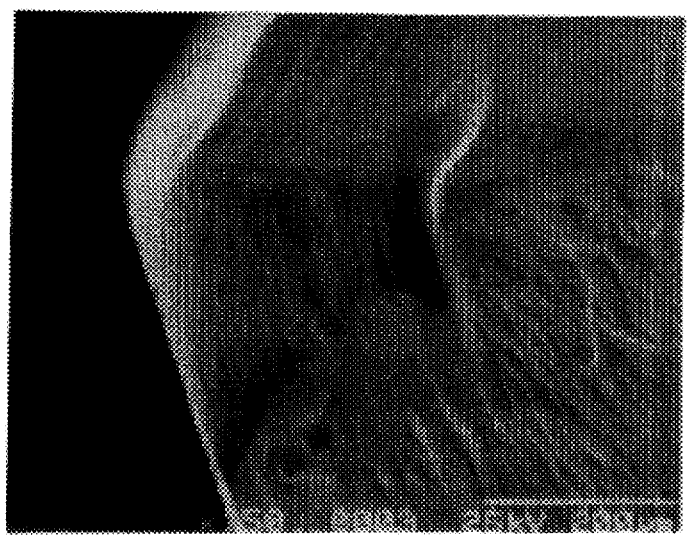

FIG. 8 shows the states of the edges of the respective indexable inserts which were damaged as the results of these experiments. This figure shows thermal cracking of the cutting edge sand flank wear conditions, and FIGS. 9A and 9B are enlarged views showing such thermal cracking and flank wear respectively. More specifically, FIG. 9A shows the state of thermal cracking caused on a cutting edge. In general, the damaged state of the edge is changed from cracking to chipping as the number of such thermally cracked portions and the depths thereof are increased. Thus, a longer tool life can be attained as the number of such thermally cracked portions and depths thereof are reduced.

FIG. 9B shows flank wear which was caused on the cutting edge while rounding the edge. In this case, a longer tool life can be attained as the flank wear width is reduced, due to the occurrence of no thermal cracking. It is understood from the states of the edges that were damaged as the results of experiments shown in FIG. 8, that occurrence of thermal cracking is so gradually suppressed that the number of thermally cracked portions is reduced as the negative land angle θ is increased, regardless of the subcutting edge angle β.

Then, it has been recognized by varying the subcutting edge angle β while retaining the negative land angle θ at a constant value that the edge is easily affected by heat to cause thermal cracking as the subcutting edge angle β is decreased, while the occurrence of thermal cracking is reduced and flank wear is increased as the subcutting edge angle β is increased. Among the indexable inserts of experiments Nos. 1 to 12 shown in FIG. 8, that of experiment No. 8 having the negative land angle θ of 45° and the subcutting edge angle β of 45° exhibited small thermal cracking and small flank wear.

Figure 18A:
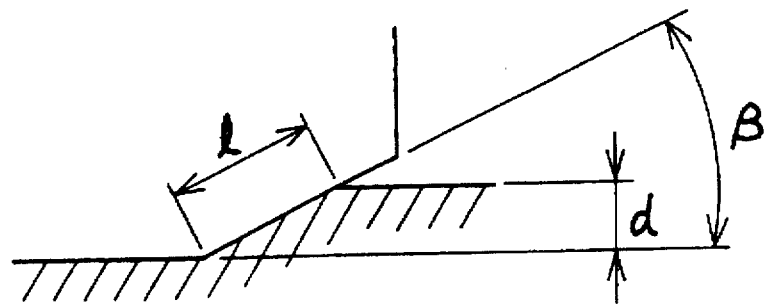
FIGS. 18A, 18B and 18C are enlarged plan views showing contact portions between workpieces and a straight subcutting edge having a relatively small subcutting edge angle $\beta$, a straight subcutting edge having a relatively large subcutting edge angle $\beta$ and an arcuate subcutting edge, respectively.
Figure 18B:
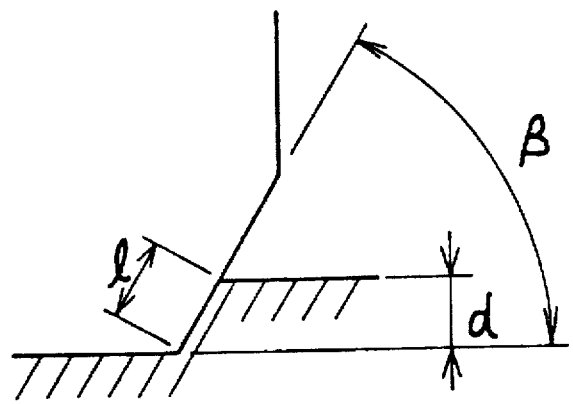
Figure 18C:
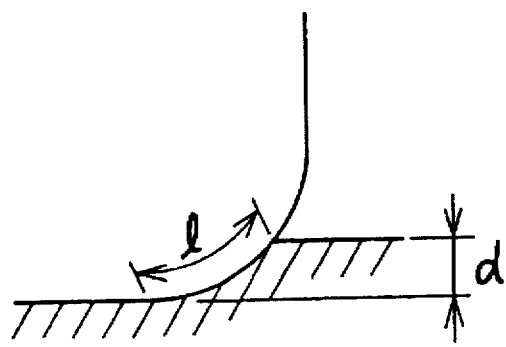

The relation between the value of the subcutting edge angle β and the heat effect in cutting is described as follows, by comparison of FIGS. 18A and 18B. While the contact length 1 between the workpiece and the subcutting edge is relatively increased at a prescribed depth of cut d when the subcutting edge angle β is relatively small as shown in FIG. 18A, the contact length 1 between the subcutting edge and the workpiece at the same depth of cut d is remarkably reduced when the subcutting edge angle β is increased, as shown in FIG. 18B. Since the heat effect in cutting is increased as the contact length 1 is increased, it is understood that the heat effect in cutting can be reduced as the subcutting edge angle β is increased.

When the subcutting edge angle β was increased in practice, however, flank wear was increased while rounding the cutting edge due to an increase of the actual chip thickness and an increase of the cutting resistance to reduce sharpness, although the occurrence of thermal cracking was prevented. The state of the cutting edge damaged in this case has already been described in detail with reference to FIG. 9B.

Noting the negative land angle θ, thermal cracking is easily caused and the depth of the cracked portion is increased when this angle is 25°. On the other hand, thermal cracking is hardly caused when the negative land angle θ is 45°, and even if thermal cracking is caused, the progress thereof is retarded. Thus, it has been proved that the subcutting edge angle β should be in the range of 30° to 60° and the negative land angle θ should be in the range of 30° to 45° in a proper edge shape for minimizing the occurrence of thermal cracking and maintaining the sharpness of the cutting edge.

EXAMPLE 2

Figure 10:
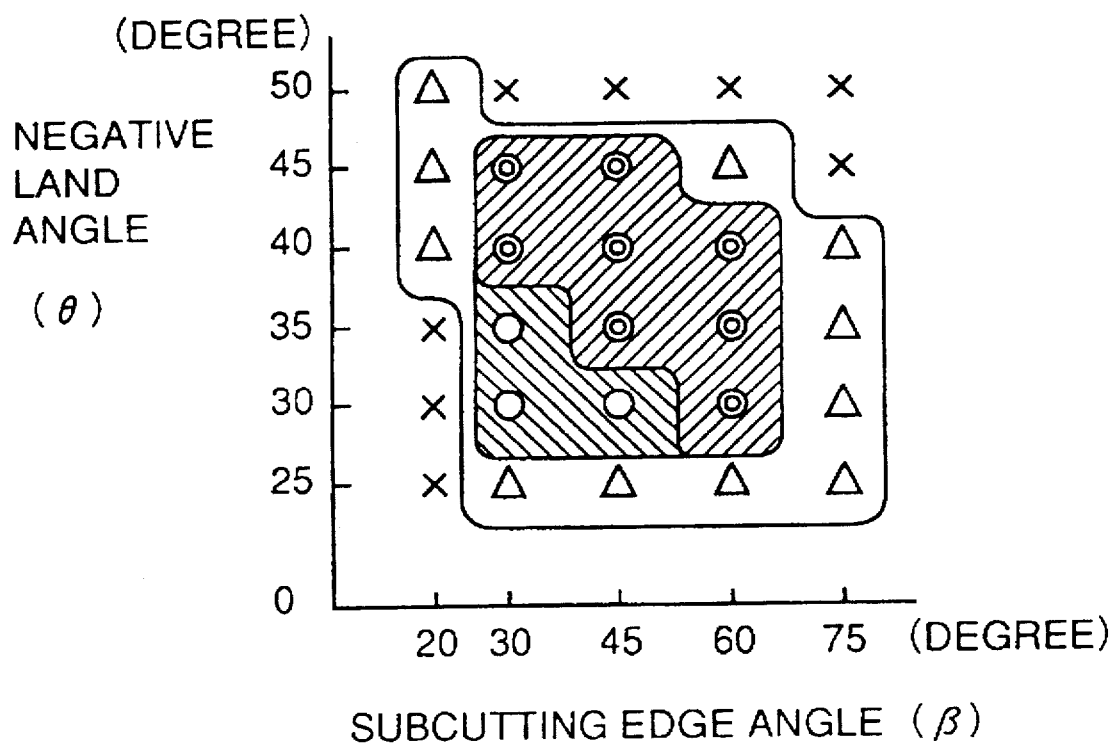
FIG. 10 illustrates results of experiments in Example 2 of the present invention.
Figure 16:
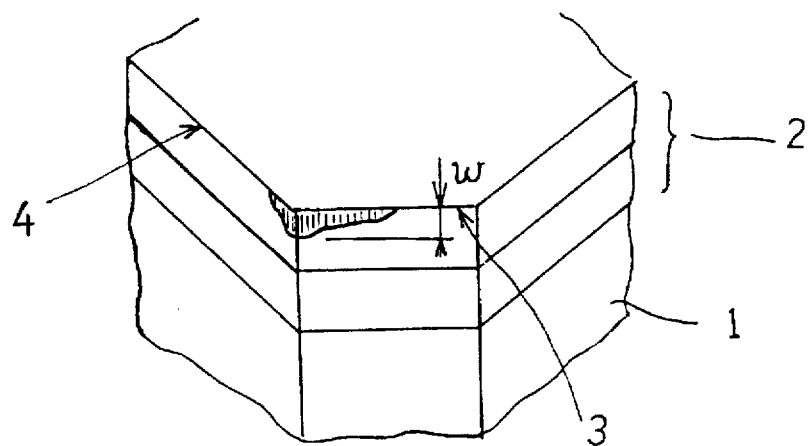
FIG. 16 is an enlarged perspective view showing a portion around a subcutting edge for illustrating definition of a flank wear width w of a cutting edge.

In order to examine the relation between the subcutting edge angle β and the negative land angle θ in further detail on the basis of the results of Example 1, experiments were made by varying combinations of these angles as shown in FIG. 10. The negative land width L was fixed at 0.2 mm. The same workpieces as those in Example 1 were employed, to check the numbers of pass times up to a prescribed flank wear width, defined by a width w shown in FIG. 16, of 0.2 mm under conditions of a cutting speed of 1500 m/min., a feed rate of 0.15 mm/tooth, and a depth of cut of 0.5 mm. A cutter 200 mm in diameter, which was identical to that in Example 1, was so employed that in each case a single indexable insert having various negative land angles θ and subcutting edge angles β was clamped into this cutter for cutting the workpieces.

Consequently, it has been verified that ranges enabling cutting for 180 to 200 passes are 30° to 60° for the subcutting edge angle β and 30° to 45° for the negative land angle θ respectively. Further, it was possible to attain machined surface roughness of at least 6.3 Z under JIS (Japanese Industrial Standard) by face milling with such a cutting edge. In Example 2, the flank wear width reached 0.2 mm after cutting for 180 to 200 passes since only one indexable insert was clamped into the cutter body. In actual machining of a cylinder block for an automobile engine, for example, at least eight indexable inserts are generally clamped into a cutter. In practice, therefore, at least 8×200 passes, i.e., at least 1600 passes can be expected for the tool life.

EXAMPLE 3

Then, the following experiments were made in order to compare the life of the inventive indexable insert with those of conventional indexable inserts made of cemented carbide and ceramic. Indexable inserts of cemented carbide (K10), ceramic ($Al_2O_3$—TiC) and sintered CBN compacts were clamped on a face milling cutter 200 mm in diameter respectively for cutting workpieces at a constant feed rate f of 0.15 mm/tooth and a constant depth of cut d of 0.5 mm and various cutting speeds Vm/min., to check numbers of cutting passes causing flank wear widths of 0.2 mm. The workpieces were identical to those employed in Example 1. The sintered CBN compacts were prepared from those employed in experiments Nos. 1, 4 and 8 in Example 1.

Figure 11:
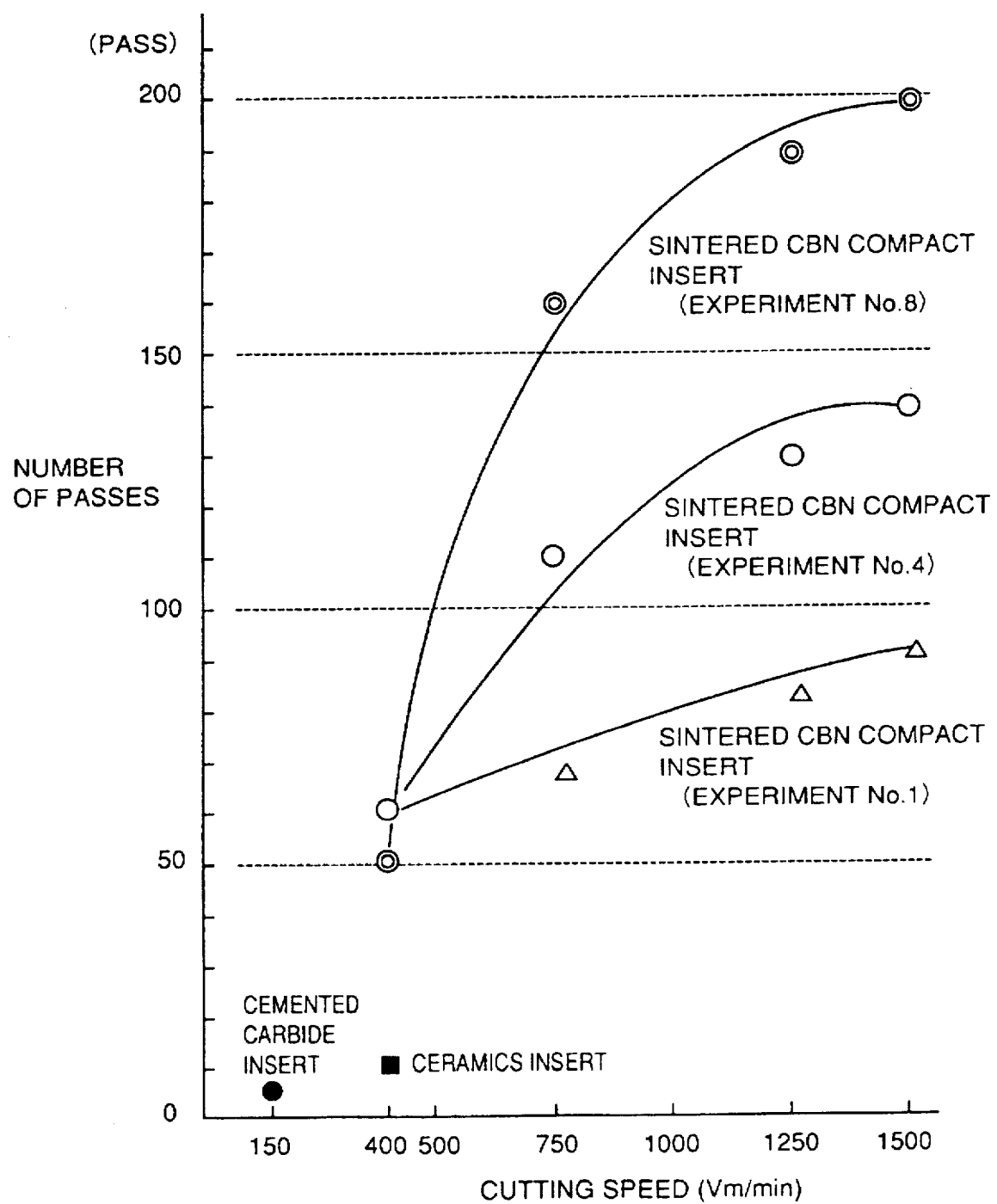
FIG. 11 illustrates results of experiments in Example 3 of the present invention.

FIG. 11 shows the results of experiments in Example 3. As understood from FIG. 11, flank wear was so quickly caused that the flank wear width reached 0.2 mm after cutting for 5 passes in the indexable insert of cemented carbide cutting the workpiece at a cutting speed of 150 m/min. In the indexable insert of ceramic, the flank wear width reached 0.2 mm after cutting the workpiece for 10 passes at a cutting speed of 400 m/min.

As to the sintered CBN compacts which were employed for cutting the workpieces at cutting speeds in the range of 400 to 1500 m/min., on the other hand, each indexable insert of the sintered CBN compact of experiments Nos. 1, 4 and 8 reached a flank wear width of 0.2 mm with 50 to 60 passes at the cutting speed of 400 m/min. which was identical to that for the ceramic indexable insert, and attained a tool life which was 5 to 6 times that of the ceramic indexable insert. The lives of these indexable inserts were further increased as the cutting speeds were increased, such that the indexable insert of the sintered CBN compact of experiment No. 8 was capable of cutting the workpiece for 200 passes at a cutting speed of 1500 m/min. and attained a life of 20 and 40 times those of the ceramic and cemented carbide indexable inserts, respectively, although the indexable inserts of the sintered CBN compacts of experiments Nos. 1 and 4 were chipped by thermal cracking at 90 and 140 passes respectively.

EXAMPLE 4

Figure 12A:
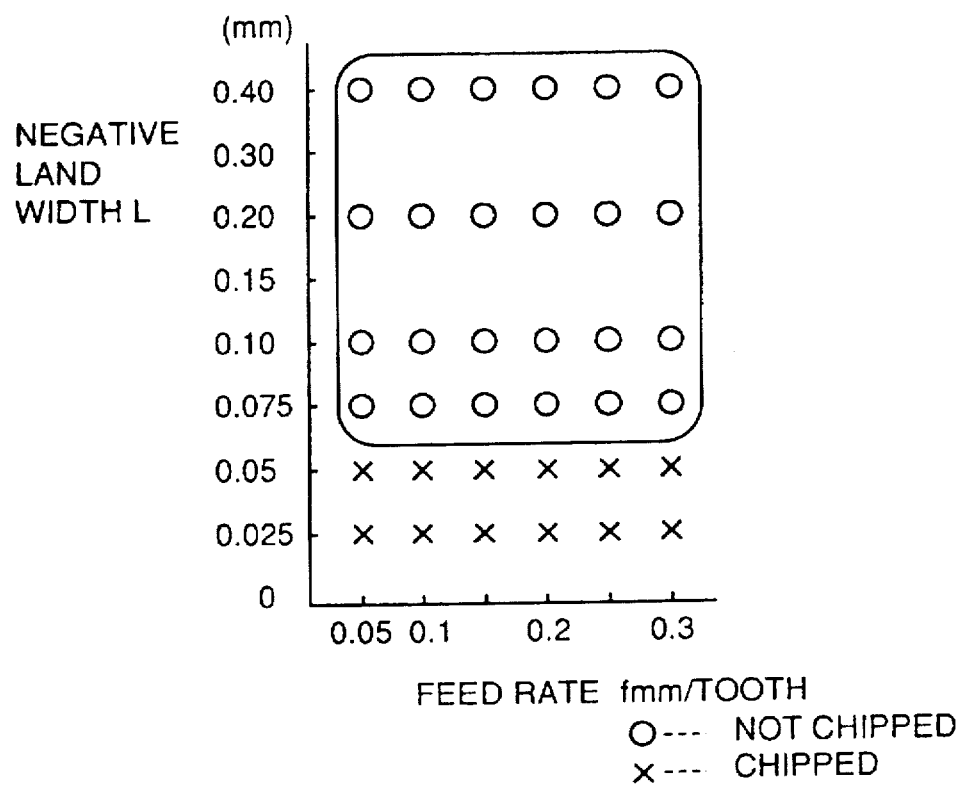
FIGS. 12A and 12B illustrate results of experiments in Example 4 of the present invention respectively.
Figure 12B:
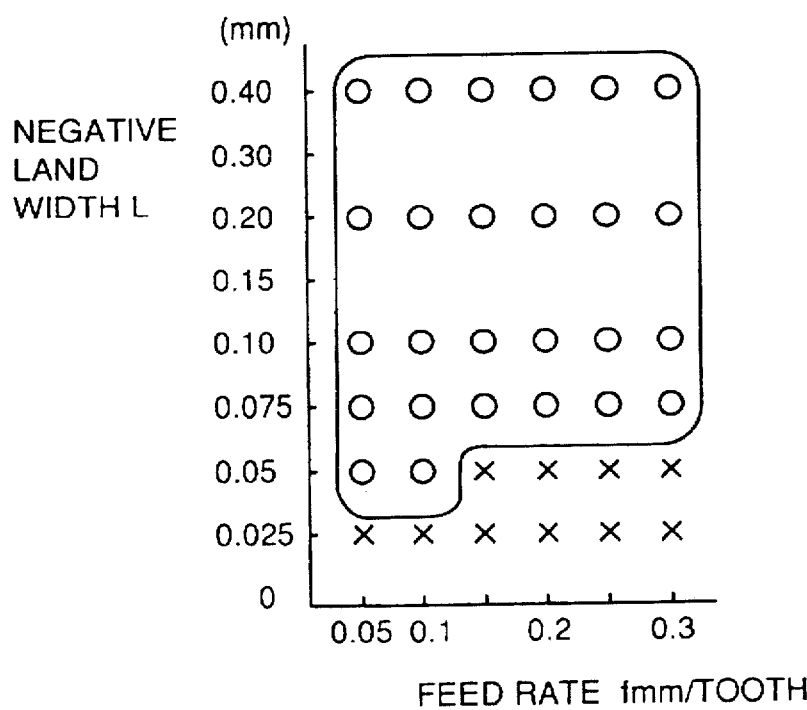

Then, the negative land width L was varied in the range of 0.025 to 0.40 mm in six types of indexable inserts and the feed rate f was varied in the range of 0.05 to 0.30 mm/tooth as shown in FIGS. 12A and 12B to check presence/absence of chipping of cutting edges, in order to analyze the proper value of the negative land width L. Workpieces identical to those in Example 1 were employed and each of the aforementioned six types of indexable inserts was clamped on a face milling cutter 200 mm in diameter to cut the workpieces at a cutting speed of 1500 m/min. and a depth of cut of 0.5 mm.

FIG. 12A shows the results of cutting tests which were made with edges having subcutting edge angles β of 45° and negative land angles θ of 30°. When the negative land widths L were 0.025 mm and 0.05 mm, the cutting edges were chipped with respect to all feeds. When the negative land widths L were at least or in excess of 0.075 mm, on the other hand, occurrence of chipping was suppressed.

FIG. 12B shows the results of cutting tests which were made with edges having subcutting edge angles β of 45° and negative land angles θ of 45°. While the cutting edges were not chipped at the negative land widths L of 0.05 mm when the feed rates f were 0.05 mm/edge and 0.10 mm/edge, chipping was caused when the feed rates were at least or in excess of 0.15 mm/edge.

Figure 19:
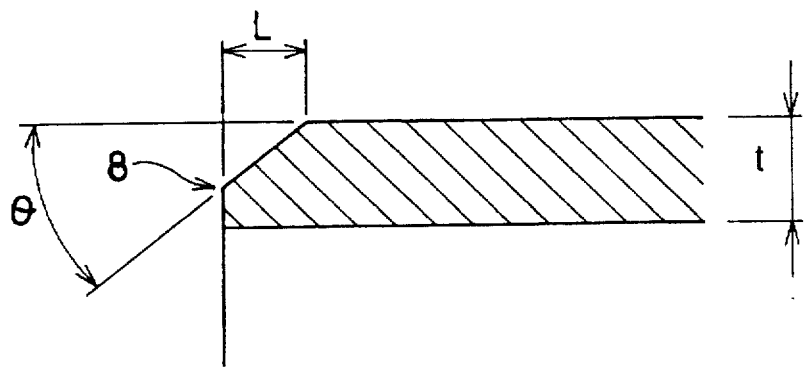
FIG. 19 illustrates an exemplary cutting edge, worked with a negative land angle $\theta$ and a negative land width L of proper values, having a cutting edge ridgeline 8 formed on a CBN layer.
Figure 20:
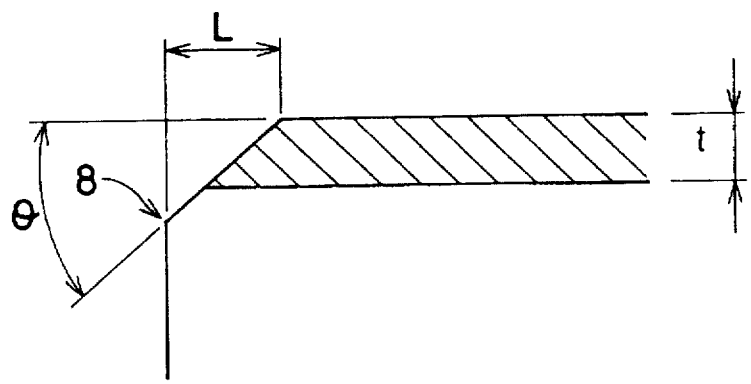
FIG. 20 illustrates a portion around a cutting edge of a tool, worked with a negative land angle $\theta$ and a negative land width L larger than proper values, having a cutting edge 8 formed outside a CBN layer in an enlarged manner.
Figure 21:
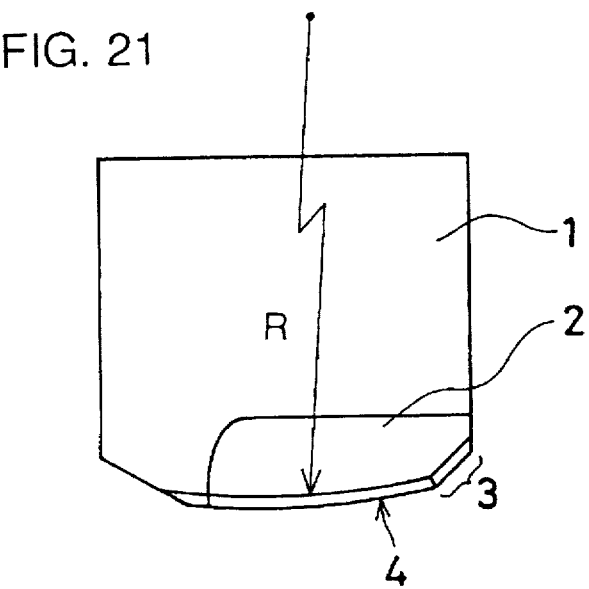
FIG. 21 illustrates a typical flat drag type cutting edge of an indexable insert.

Analyzing the data shown in FIGS. 12A and 12B together, it is understood that the negative land width L must be at least 0.05 mm, and preferably at least 0.075 mm, in order to prevent chipping in the normal feed rate range of 0.05 to 0.30 mm/edge. As to the upper limit of the negative land width L, no cutting edges were chipped up to 0.4 mm. However, the remaining thickness of the CBN layer becomes thinner and the time for grinding the negative land is disadvantageously increased when the negative land width L is increased beyond 0.4 mm, since the CBN layer of the sintered CBN compact is about 0.8 mm in thickness as already described with reference to FIGS. 19 and 20. Therefore, the upper limit of the negative land width L must be not more than 0.4 mm, and preferably not more than 0.3 mm.

EXAMPLE 5

Figure 13:
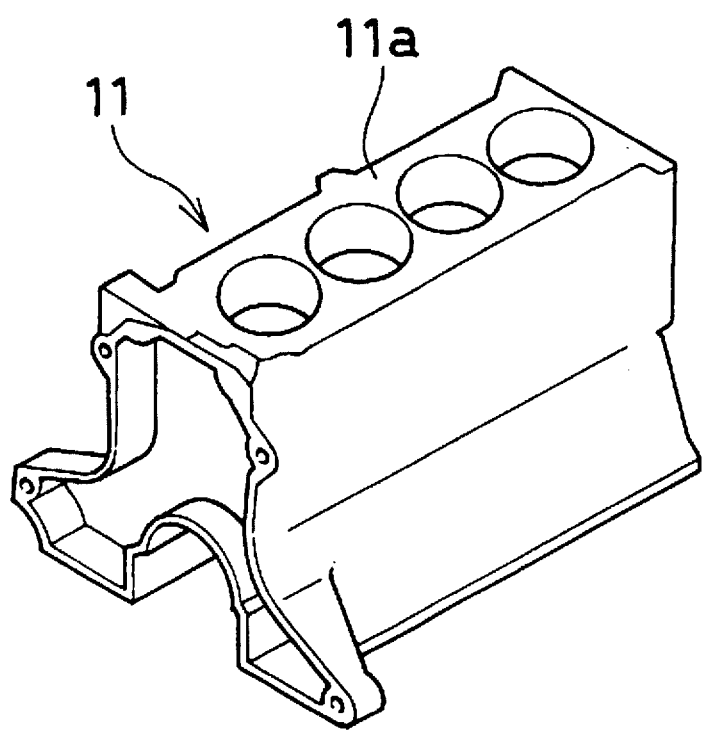
FIG. 13 is a perspective view showing a cylinder block employed as a workpiece for each experiment in Example 5 of the present invention.

Then, 12 indexable inserts of experiment No. 1 of Example 1 were clamped into a face milling cutter 250 mm in diameter, to cut an upper surface 11a of a cylinder block 11 shown in FIG. 13, which was an automobile engine part of cast iron, under conditions of a cutting speed of 1500 m/min., a feed rate of 0.15 mm/tooth and a depth of cut of 0.5 mm in practice. Table 1 shows the cutting conditions and the resulting tool lives. A similar cutting test was made with indexable inserts of experiment No. 8 of Example 1.

Figure 14A:
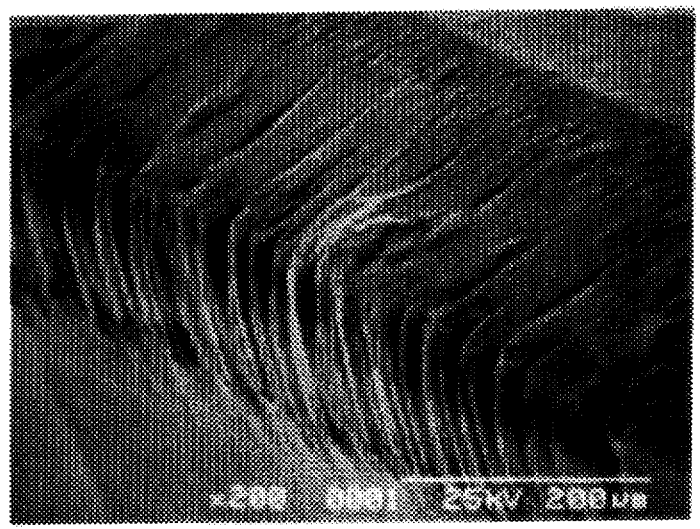
FIGS. 14A, 14B and 14C are microphotographs showing the state of a cutting edge having thermal cracks in Example 5 of the present invention, the state of a cutting edge that has chipped off with progress of thermal cracks, and the state of a cutting edge of an indexable insert that was worn after a cutting test in experiment No. 8 of Example 5 respectively.
Figure 14B:
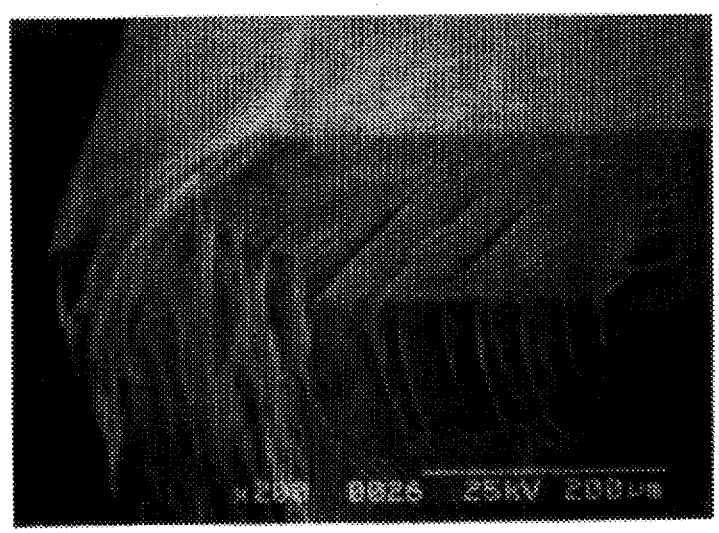
Figure 14C:
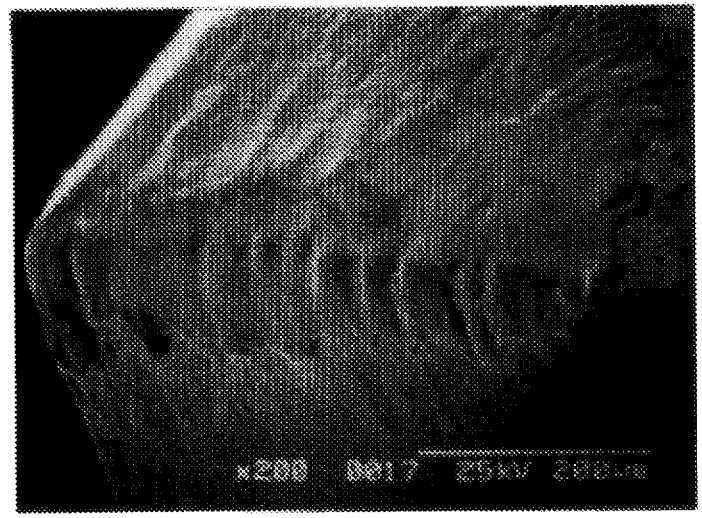

In the results of the cutting tests for the cylinder blocks, a number of thermal cracks were caused in the indexable inserts of experiment No. 1 after cutting 450 workpieces as shown in FIG. 14A, and the cutting edges were chipped off by thermal cracking as shown in FIG. 14B when the operation was further continued to cut 600 workpieces, whereby the end of the useful life of each cutting edge was reached. When the indexable inserts of experiment No. 8 were employed, on the other hand, no thermal cracking was caused as shown in FIG. 14C and no chipping resulted from thermal cracking while only rounded flank wear was observed in the cutting edges, and it was possible to regrind and reuse the cutting edges after cutting 2500 workpieces.

TABLE 1

| Used Insert | Employed Cutting Conditions | | Life (Number of Cut Workpieces) |
|---|---|---|---|
| The same shape as experiment No. 1 (β = 20°, θ = 25°) | Cutting Speed Feed Rate Depth of Cut Number of Edges | V = 1500 m/min F = 3438 mm/min d = 0.5 mm 12 | 600 |
| The same shape as experiment No. 8 (β = 45°, θ = 45°) | | | 2500 |

According to the inventive indexable insert for milling, as hereinabove described, it is possible to suppress chipping resulting from the thermal cracking by setting the subcutting edge angle, the negative land angle and the negative land width in prescribed ranges respectively while forming the subcutting edge as a straight edge. Reduction of sharpness and chipping of the cutting edge resulting from thermal cracking are prevented also in high-speed milling of at least 800 m/min. or at least 1000 m/min. so that the tool life can be extended, while an excellent surface finish can be attained with a machined surface roughness of a workpiece of at least 6.3 Z under JIS. Consequently, productivity can be remarkably improved in the face milling of parts which are made of gray cast iron, in particular.

According to the inventive milling cutter, on the other hand, the aforementioned indexable insert according to the present invention is applied to every one of a plurality of indexable inserts clamped thereon, whereby the indexable insert can achieve high-speed cutting and attain excellent machined surface roughness in milling. Consequently, it is possible to provide a milling cutter which remarkably contributes to an improvement of productivity in the milling of cast iron.

Although the invention has been described and illustrated in detail, it is clearly understood that the same is by way of illustration and example only and is not to be taken by way of limitation, the spirit and scope of the present invention being limited only by the terms of the appended claims.

What is claimed is:

1. An indexable insert for use in a milling cutter for face milling, comprising:
   a metal base made of cemented carbide containing WC and Co, and a cutting edge member consisting of a sintered cubic boron nitride compact connected to said metal base,
   wherein said cutting edge member includes a straight-shaped subcutting edge having a subcutting edge angle (β) of at least 30° and not more than 60°, includes a flat drag type cutting edge being continuous to said subcutting edge, and has a negative land angle (θ) of at least 30° and not more than 45°, a negative land width (L) of at least 0.05 mm and not more than 0.40 mm, and a clearance angle (α) in a range of 5° to 20°.

2. The indexable insert in accordance with claim 1, wherein said negative land width (L) is at least 0.075 mm and not more than 0.30 mm.

3. The indexable insert in accordance with claim 1, wherein said flat drag type cutting edge is in the form of a circular arc having a radius of curvature of at least 200 mm and not more than 400 mm.

4. A milling cutter for face milling comprising a plurality of indexable inserts, wherein every one of said plurality of indexable inserts respectively comprises
   a metal base made of cemented carbide containing WC and Co, and
   a cutting edge member consisting of a sintered cubic boron nitride compact that is brazed to or integrally sintered with said metal base,
   wherein said cutting edge member includes a straight-shaped subcutting edge having a subcutting edge angle (β) of at least 30° and not more than 60°, includes a flat drag type cutting edge being continuous to said subcutting edge, and has a negative land angle (θ) of at least 30° and not more than 45°, a negative land width (L) of at least 0.05 mm and not more than 0.40 mm, and a clearance angle (α) in a range of 5° to 20°.

5. The milling cutter in accordance with claim 4, wherein said negative land width (L) of every one of said plurality of indexable inserts is at least 0.075 mm and not more than 0.30 mm.

6. The milling cutter in accordance with claim 4, wherein said flat drag type cutting edge of every one of said plurality of indexable inserts is in the form of a circular arc having a radius of curvature of at least 200 mm and not more than 400 mm.

7. A milling cutter for face milling comprising a plurality of indexable inserts, wherein only some of said plurality of indexable inserts respectively comprise:

a metal base made of cemented carbide containing WC and Co, and a cutting edge member consisting of a sintered cubic boron nitride compact that is brazed to or integrally sintered with said metal base, wherein said cutting edge member includes a straight-shaped subcutting edge having a subcutting edge angle ($\beta$) of at least 30° and not more than 60°, includes a flat drag type cutting edge being continuous to said subcutting edge, and has a negative land angle ($\theta$) of at least 30° and not more than 45°, a negative land width (L) of at least 0.05 mm and not more than 0.40 mm, and a clearance angle ($\alpha$) in a range of 5° to 20°.

8. The milling cutter in accordance with claim 7, wherein said negative land width (L) is at least 0.075 mm and not more than 0.30 mm.

9. The milling cutter in accordance with claim 7, wherein said flat drag type cutting edge is in the form of a circular arc having a radius of curvature of at least 200 mm and not more than 400 mm.

10. The milling cutter in accordance with claim 7, wherein said plurality of indexable inserts further includes at least one insert selected from the group consisting of cemented carbide inserts and ceramic inserts.

11. The indexable insert in accordance with claim 1, wherein said cutting edge member is connected to said metal base by brazing.

12. The indexable insert in accordance with claim 1, wherein said cutting edge member is connected to said metal base by being integrally sintered therewith.

13. The indexable insert in accordance with claim 1, wherein said sintered cubic boron nitride compact comprises a substrate of cemented carbide and a cubic boron nitride layer arranged on said substrate.

14. The indexable insert in accordance with claim 13, wherein said cubic boron nitride layer has been integrally sintered with and on said substrate.

15. The indexable insert in accordance with claim 13, wherein said subcutting edge has a cutting edge ridgeline located within a thickness of said cubic boron nitride layer.

16. The indexable insert in accordance with claim 1, wherein said clearance angle ($\alpha$) is about 15°.

17. The indexable insert in accordance with claim 1, wherein said subcutting edge angle ($\beta$) and said negative land angle ($\theta$) are further limited so that $\theta \leq 60-(\frac{1}{3} \beta)$.

18. The indexable insert in accordance with claim 17, wherein said subcutting edge angle ($\beta$) and said negative land angle ($\theta$) are further limited so that $\theta \geq 50-(\frac{1}{3} \beta)$.

19. The indexable insert in accordance with claim 1, wherein said subcutting edge angle ($\beta$) is about 45° and said negative land angle ($\theta$) is about 40°.

20. The indexable insert in accordance with claim 1, wherein said subcutting edge angle ($\beta$) and said negative land angle ($\theta$) are selected to achieve an improved working life of said insert at a cutting speed of at least 1000 m/min.

* * * * *